UNITED STATES PATENT OFFICE.

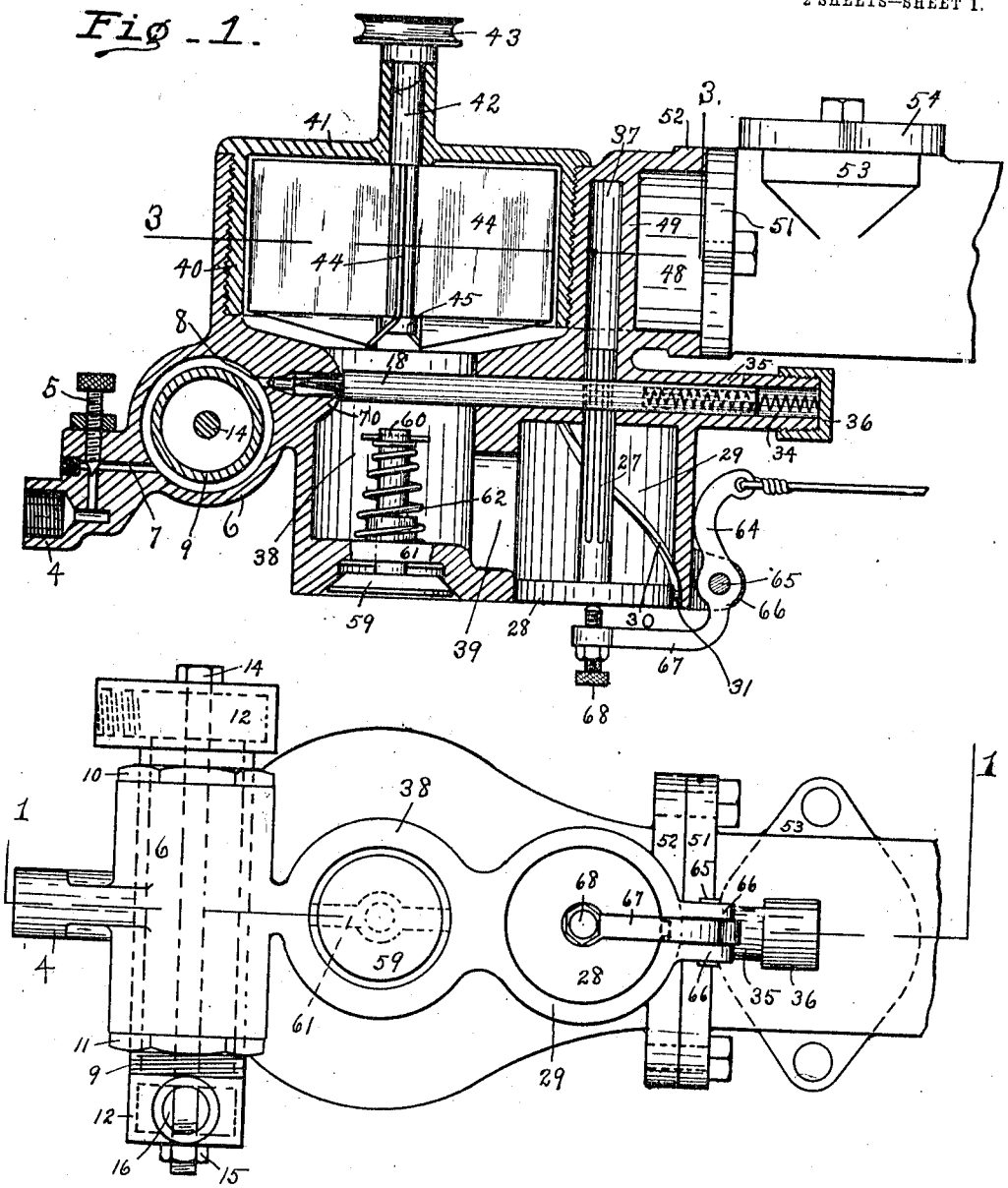

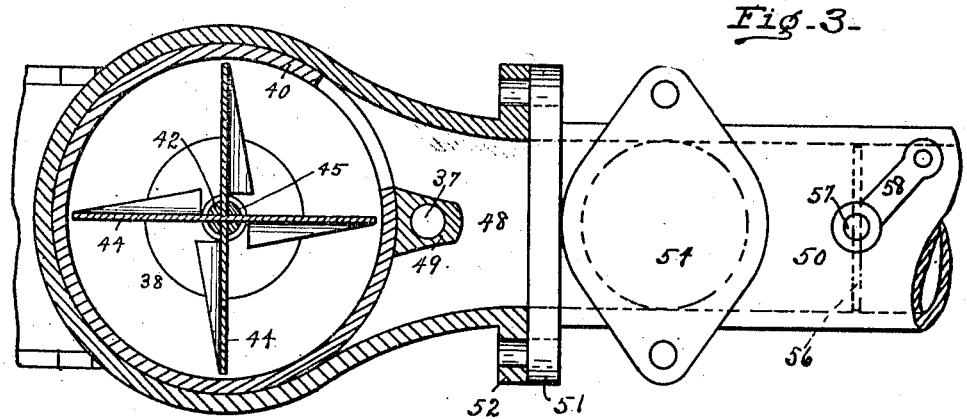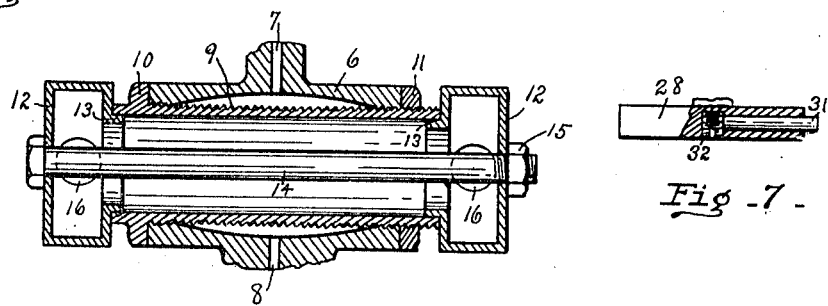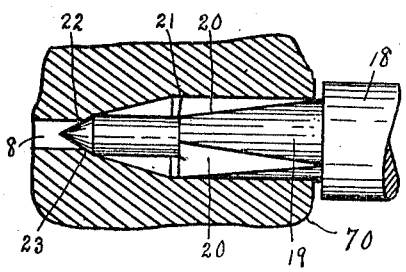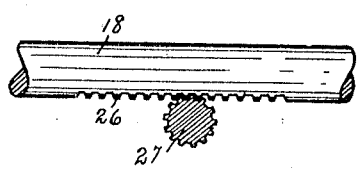

ROYAL J. DUNN, OF PORT HURON, MICHIGAN.

CARBURETER.

1,020,270.  Specification of Letters Patent.   Patented Mar. 12, 1912.

Application filed January 9, 1911. Serial No. 601,625.

*To all whom it may concern:*

Be it known that I, ROYAL J. DUNN, a citizen of the United States, and a resident of Port Huron, in the county of St. Clair and State of Michigan, have invented a new and Improved Carbureter, of which the following is a specification.

This invention relates to means for carbureting fuel for explosion engines, and its object is to provide a device, having air and fuel valves, in which the distance the fuel valve is opened will be in proportion to the distance the air valve is opened, and in which the flow of air and fuel oil shall be practically constant.

In the accompanying drawings, Figure 1 is a section on the line 1—1 of Fig. 2. Fig. 2 is a bottom view of the carbureter. Fig. 3 is a section on the line 3—3 of Fig. 1. Fig. 4 is a cross section of the heating device. Fig. 5 is an enlarged view of the fuel valve. Fig. 6 is a view of a portion of the stem of the fuel valve. Fig. 7 is a detail of the air valve.

Similar reference characters refer to like parts throughout the several views.

This carbureter comprises a heating device for the fuel oil, a carbureting chamber, a fan and its chamber, an air valve and its chamber, and a fuel oil valve operated by the air valve. The carbureter connects to the source of fuel supply by means of any desired pipe which may screw into the sleeve 4. A needle valve 5 controls the flow of the fuel oil to the heating device, which consists of a chamber 6 having an inlet passage 7 and an outlet passage 8. Within the chamber may be screwed the pipe 9 having a collar 10 near one end and a lock nut 11 at the other. A connection 12, having a collar 13 fitting within the pipe 9, is secured to each end of the pipe by means of a bolt 14 and nut 15. These connections may extend at any angle from the carbureter and the outer opening 16 of one is adapted to receive a branch of the exhaust pipe of the engine, whereby a portion of the hot gases are caused to pass through the pipe 9. The outer opening 16 of the other connection receives a pipe to convey away these gases after they have passed through the carbureter. The bore of the chamber 6 is such that the distance between its wall and the pipe 9 decreases from the inlet pipe toward its ends as shown in Fig. 4. The flow of fuel from this chamber is controlled by a valve at the end of the stem 18, and which is more clearly shown in Fig. 5. The stem has a reduced portion 19 which is cut away on a taper on several sides to form flat surfaces 20. This portion is slidable in the bore 21. Beyond this part 20 is the needle valve 22 which seats at 23. The inner ends of the flat surfaces project beyond the bore 21 so that this bore always communicates with the carbureting chamber. When the needle valve 22 is moved from its seat, the fuel will flow out of the passage 8 and over the flat surfaces 20, the amount being determined by the distance the valve is withdrawn, that is, by the opening formed between these flat surfaces and the bore.

The stem 18 is formed with teeth 26 which mesh with the toothed stem 27 of the air valve 28. This valve moves in the bore 29 which has a spiral groove 30, in which the pin 31 on the valve 28 travels. This pin may be removably mounted in the valve 28 as shown in Fig. 7, the pin being positioned by the screw 32. The stem 18 may be formed hollow at its outer end, and in its bore a spring 34 may be mounted. A sleeve 35 projects from the body of the carbureter to furnish a bearing for the stem, and a cap 36 on its outer end holds the spring 34 in position. The toothed stem 27 is slidably guided in the bore 37. The air passes from the bore 29 into the chamber 38 through the passage 39. This chamber 38 is enlarged at its upper end and receives the cylindrical shell 40 having a head 41. The head may be provided with a hub in which is journaled the fan shaft 42. Any desirable bearings may be employed. Any desired means may be employed to drive the shaft from the engine, a pulley 43 being shown. The shaft 42 may be slitted to receive the fan-blades 44, and a small ring 45 may be employed to hold the ends of the shaft together. The constantly running fan creates a partial vacuum in the carbureting chamber 38, thereby accelerating the carbureting of the fuel and also rendering the carbureting practically constant. Any desired number of blades may be employed, four preferred, and their lower edges are preferably inclined as shown in Fig. 1 and this inclined portion bent in the direction of rotation. The shell 40 has an opening which permits the mixture to pass into the passage 48 on either side of the post 49 according to the direction of rotation of the fan.
A pipe 50, having a flange 51, connects to the flange 52 on the body of the carbureter. This pipe may also be formed with a second opening, and with a flange 53 around the same, which opening is normally closed by the plate 54. If desired, the flanges 51 and 52 may be disconnected, the plate 54 removed, the flange 53 connected to the flange 52, and the plate 54 secured across the end of the pipe to the flange 51. The pipe 50 will then extend upward instead of longitudinally. Any desired type of throttle valve 56 may be mounted where desired, the stem 57 being provided with a lever 58.

To prevent damage from back fire, a relief valve 59 may be mounted in the lower end of the chamber 38, its stem 60 passing through the cross bar 61, and a spring 62 normally holding it onto its seat. To prime the engine, by permitting some fuel oil to flow from the passage 8, a small lever is mounted on the pin 65 carried by the lugs 66. The upper arm 64 of the lever has a cord connected to it, while the lower arm 67 carries an adjusting screw 68 which engages the valve 28. Outward movement of the arm 64 raises the valve, the groove 30 causes the valve and stem 27 to turn, and the stem 18 and valve 22 move back from the seat 23, permitting the fuel oil to flow. The amount of flow depends upon the distances the valves move. This screw 68 also limits the downward movement of the air valve and the inward movement of the fuel valve to such an extent as to prevent the parts being jammed.

The operation of the carbureter is as follows. The maximum amount of fuel-oil is controlled by the valve 5. The fuel-oil flows around the pipe 9 and is heated so that it freely volatilizes and is taken up by the air which rushes over the knob 70. The fan draws the air through the bore 29, lifting the valve 28 and opening the valve 22. It further thoroughly mixes the fuel oil with the air and then forces the mixture into the pipe 50. This causes a supply of explosive mixture to be stored, ready for use, at the inlet valve of the engine. By reason of the heating of the fuel oil, the heavier grades of gasolene and even gasolene heavily mixed with kerosene may be used in this carbureter. As the portion 19 of the fuel valve is tapered by the surfaces 20, the amount of flow of fuel will be in proportion to the amount of opening of the passage 39 by the valve 28.

Many changes may be made by those skilled in the art without departing from the spirit of my invention.

Having now explained my construction, what I claim as my invention and desire to secure by Letters Patent is:—

1. In a carbureter, the combination of a body, a fuel inlet, a valve controlling the flow of said fuel mounted for longitudinal movement, a spring to hold said valve on its seat, said body having a bore at right angles to said valve provided with a spiral slot, an air valve slidably mounted in said bore and having a pin movable in said slot to cause said air valve to revolve, and connections between said air valve and said fuel valve whereby the rotary movement of the air valve causes a longitudinal movement of the fuel valve.

2. In a carbureter, the combination of a body having parallel bores forming a guide for the air valve and a carbureting chamber, a third bore for the fuel valve at right angles thereto, and a passage for the fuel; a fuel valve slidably mounted in its bore to normally close the fuel passage and provided with teeth intermediate its ends, an air valve slidably mounted in its bore, means to revolve said air valve, and a stem on said air valve provided with teeth engaging the teeth on the fuel valve whereby the movement of the air valve produces a longitudinal movement of the fuel valve proportionate to the revolution of the air valve.

3. In a carbureter, the combination of a body having a fuel passage, a fuel valve for closing said passage and having a toothed stem, an air valve longitudinally and revolubly mounted in said body, and a stem for said valve provided with teeth to engage said fuel valve stem, whereby the turning of the air valve will move the fuel valve longitudinally.

4. In a carbureter comprising a body provided with a mixing fan and an air passage leading from a valve seat to said fan, the combination of an air valve mounted in said passage for horizontal and longitudinal movement, a stem connected thereto having longitudinal teeth, and a fuel valve mounted transversely to said stem in said passage adjacent the fan and having teeth to engage the teeth on the air valve stem whereby the air valve may move the fuel valve, said body having a liquid-fuel passage opened and closed by said fuel valve.

5. In a carbureter, the combination of a body, a fuel heating device formed therein, an air valve mounted in said body for longitudinal and rotary movement, a fuel-oil valve positioned thereby, a spring for returning both valves to normal position, and a lever operatively engaging the air valve to move the same and thereby the fuel valve to permit the entrance of fuel.

In testimony whereof I have signed this specification in the presence of two subscribing witnesses.

ROYAL J. DUNN.

Witnesses:
ALEX. MOORE,
J. F. WILSON.

Copies of this patent may be obtained for five cents each, by addressing the "Commissioner of Patents, Washington, D. C."